(12) United States Patent
Chou et al.

(10) Patent No.: US 7,758,232 B2
(45) Date of Patent: Jul. 20, 2010

(54) ELECTRONIC DEVICE

(75) Inventors: Wei-Huan Chou, Taipei (TW); Kun-Huang Hsu, Taipei (TW)

(73) Assignee: Pegatron Corporation, Taipei (TW)

( * ) Notice: Subject to any disclaimer, the term of this patent is extended or adjusted under 35 U.S.C. 154(b) by 210 days.

(21) Appl. No.: 12/172,623

(22) Filed: Jul. 14, 2008

(65) Prior Publication Data
US 2009/0027921 A1 Jan. 29, 2009

(30) Foreign Application Priority Data
Jul. 26, 2007 (TW) .............................. 96127267 A

(51) Int. Cl.
*F21V 8/00* (2006.01)
(52) U.S. Cl. ........................ 362/632; 362/610; 362/612
(58) Field of Classification Search ................. 362/610, 362/612, 613, 614, 632, 97.2, 97.3
See application file for complete search history.

(56) References Cited

U.S. PATENT DOCUMENTS

| 5,550,715 | A | 8/1996 | Hawkins |
|---|---|---|---|
| 6,592,232 | B2 | 7/2003 | McGowan |
| 6,693,690 | B2 | 2/2004 | Umemoto et al. |
| 6,929,392 | B2 * | 8/2005 | Kim et al. .................... 362/632 |
| 7,121,710 | B2 * | 10/2006 | Kim et al. .................... 362/632 |
| 2002/0145862 | A1 | 10/2002 | Uehara et al. |
| 2006/0022921 | A1 | 2/2006 | Miyake et al. |
| 2006/0077321 | A1 | 4/2006 | Ukawa |
| 2006/0209002 | A1 | 9/2006 | Uchikawa |

* cited by examiner

*Primary Examiner*—David V Bruce
(74) *Attorney, Agent, or Firm*—Muncy, Geissler, Olds & Lowe, PLLC.

(57) ABSTRACT

An electronic device includes a case, a display panel and a backlight module. The case has at least a hole. The display panel is disposed in the case to display information. The backlight module is disposed in the case as a light source of the display panel. The backlight module has at least a light emitting element, a light-guide plate and at least a light-guide tube. The light-guide plate guides the light emitted by the light emitting element to the display panel. The light-guide tube has a light input end and a light output end. The light input end is disposed at the hole of the case and is exposed outside, and the light output end is located at one side of the light-guide plate. Therefore, the light-guide tube can guide external environment light to the light-guide plate.

12 Claims, 5 Drawing Sheets

ELECTRONIC DEVICE

CROSS REFERENCE TO RELATED APPLICATIONS

This Non-provisional application claims priority under 35 U.S.C. §119(a) on Patent Application No(s). 096127267 filed in Taiwan, Republic of China on Jul. 26, 2007, the entire contents of which are hereby incorporated by reference.

BACKGROUND OF THE INVENTION

1. Field of Invention

The invention relates to an electronic device and, more particularly, to an electronic device additionally using ambient light as its light source.

2. Related Art

A liquid crystal display device includes a liquid crystal panel and a backlight module. The backlight module provides the liquid crystal panel with backlight light source, and then the liquid crystal panel can display images.

As shown in FIG. 1, a conventional liquid crystal display device 1 includes a case 11, a light-guide plate (LGP) 12, a light emitting element 13, a plurality of optical films 14 and a liquid crystal panel 15, and the LGP 12 and the light emitting element 13 are used as the backlight module.

Herein, the case 11 consists of an upper cover 111 and a lower cover 112, and the LGP 12, the light emitting element 13, the optical films 14 and the liquid crystal panel 15 are assembled in the case 11. The light emitting element 13 is disposed at one side of the LGP 12, and the light emitting element 13 may be a cold cathode fluorescent lamp (CCFL). The optical films 14 are superposed on the LGP 12, and the optical films 14 may include diffusers, brightness enhancement films, and so on.

In the structural design, the function of the LGP 12 is guiding the scattering direction of the light emitted by the light emitting element 13 to enhance the luminance of the backlight module and ensure the uniformity of the brightness of the backlight module, and the optical films 14 allows the light guided out by the LGP 12 to be further uniform and bright.

However, when a user uses the liquid crystal display device 1 in the sun, the problem that the brightness of the panel is insufficient occurs, which causes besetment in usage. Further, if the brightness of the light emitting element 13 increases to solve the above problem, another problem that it is power-consuming occurs.

Therefore, it is an important subject to provide an electronic device additionally using ambient light as its light source to solve the above problems.

SUMMARY OF THE INVENTION

The objective of the invention is to provide an electronic device additionally using external light (external ambient light) as its light source.

To achieve the above objective, the invention provides an electronic device including a case, a display panel and a backlight module. The case has at least a hole, and the display panel is disposed at the case. The backlight module is disposed in the case as the light source of the display panel, and it has at least a light emitting element, a light-guide plate and at least a light-guide tube. The light-guide plate guides light emitted by the light emitting element to the display panel, and the light-guide tube has a light input end and a light output end. The light input end is disposed at the hole and is exposed outside, and the light output end is located at one side of the light-guide plate. The light-guide tube guides external ambient light to the light-guide plate.

In the electronic device of the invention, the external light is guided to illuminate the light-guide plate via the light-guide tube, and therefore, both the ambient light and the light emitting element can be used as the light source of the backlight module, and the ambient light can be used as a main light source or an auxiliary light source according to an actual condition. Therefore, the backlight module can have double light sources (the external light and the light emitting element), and the external light can be used as the main light source in usual usage. When the brightness of the display panel is insufficient, the light emitting element can be turned on to enhance the brightness.

From the above, in the electronic device of the invention, one end of the light-guide tube passes through the case and is exposed outside, and then the ambient light can enter the light input end and be guided to the light-guide plate from the light output end. Therefore, electric power is saved, and the lifespan of the electronic device is prolonged. The ambient light can be used as the light source. The luminous intensity of the backlight module is greater along with the increase of the intensity of the ambient light, and then the problem that the brightness of the display panel is insufficient in the sun in the conventional technology is solved.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

An electronic device of a preferred embodiment of the invention is illustrated with related drawings hereinbelow.

Figure 1:
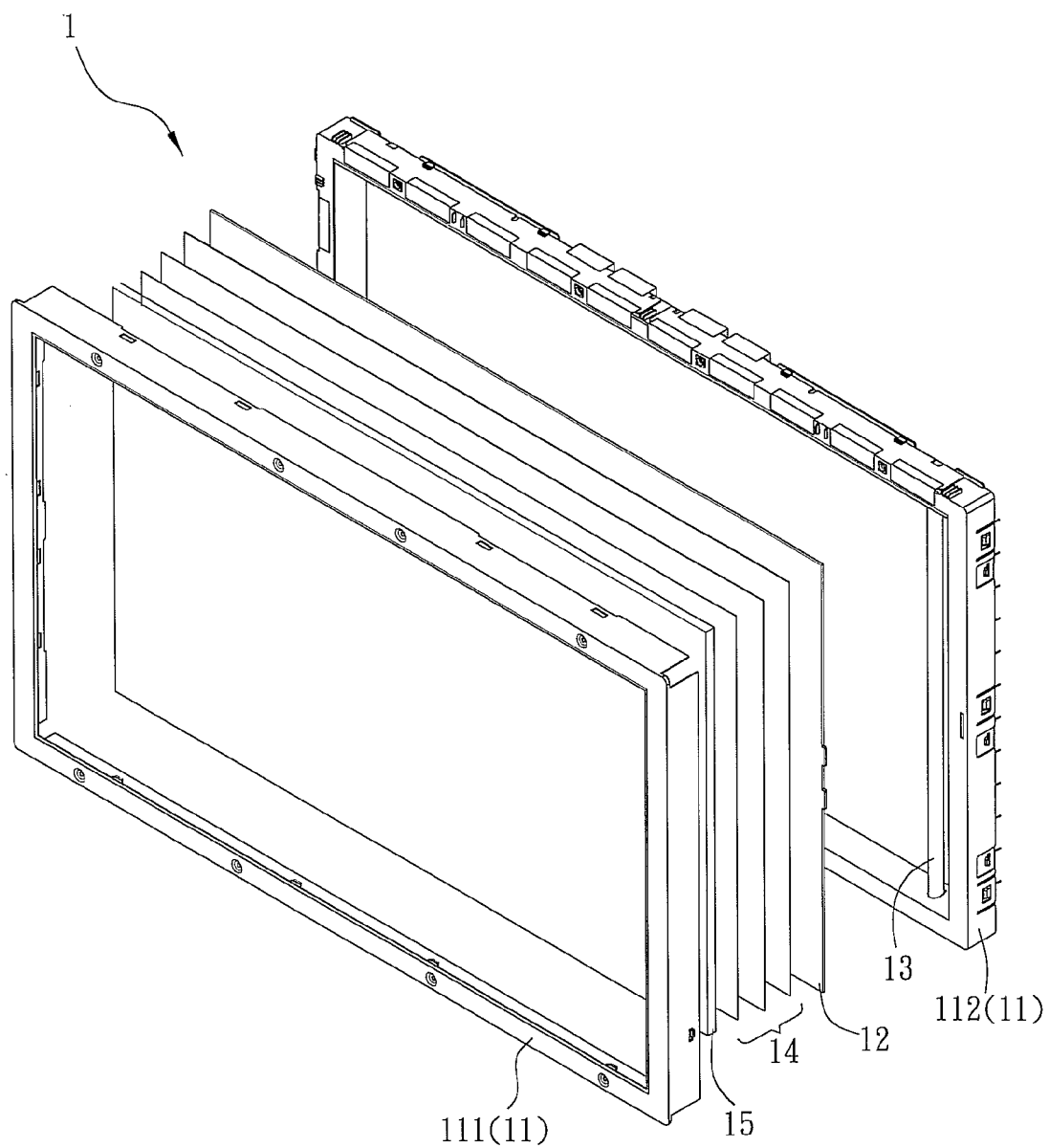
FIG. 1 is a schematic diagram showing a conventional liquid crystal display device.
Figure 2:
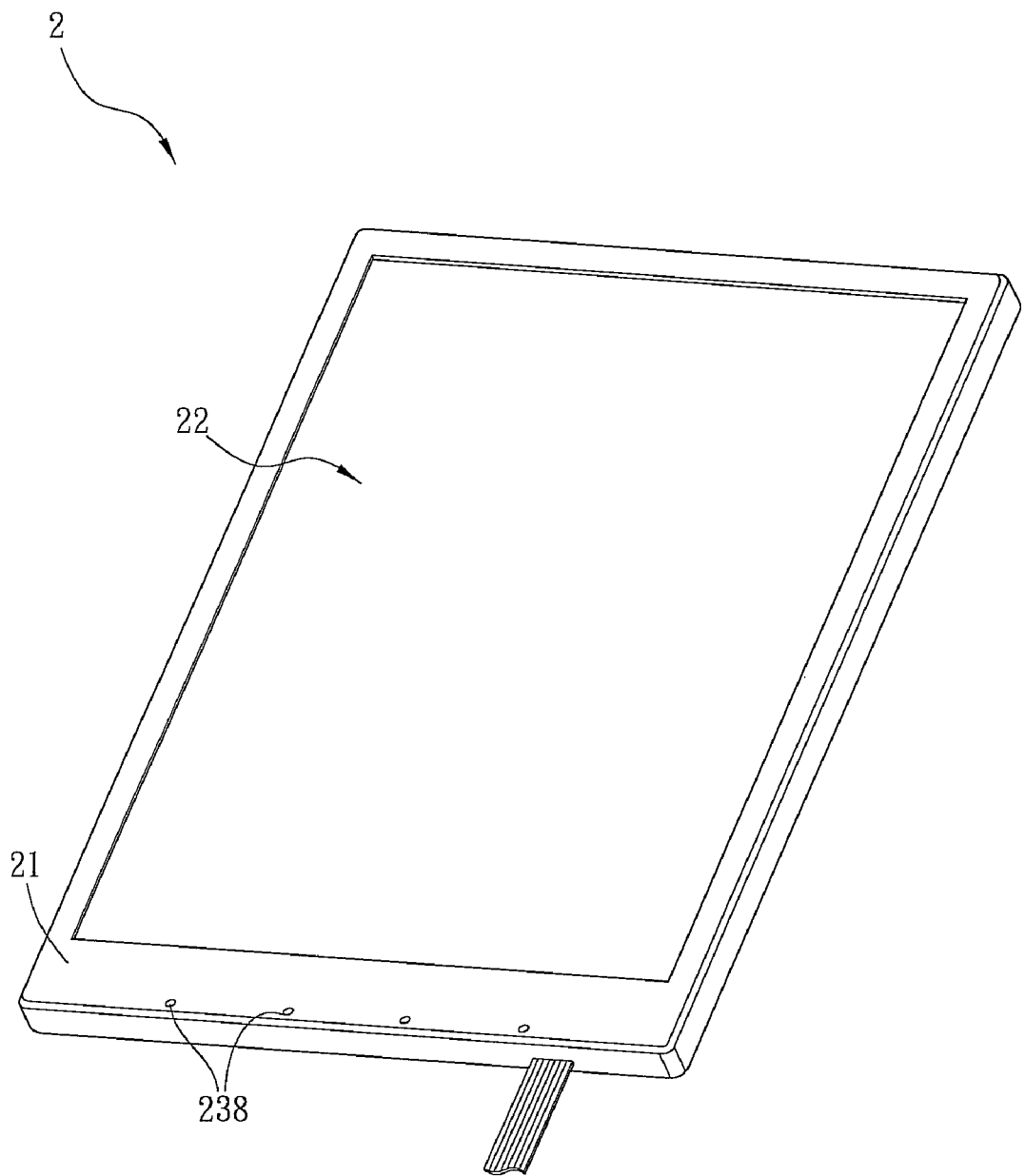
FIG. 2 is a combination diagram showing an electronic device according to a preferred embodiment of the invention.
Figure 3:
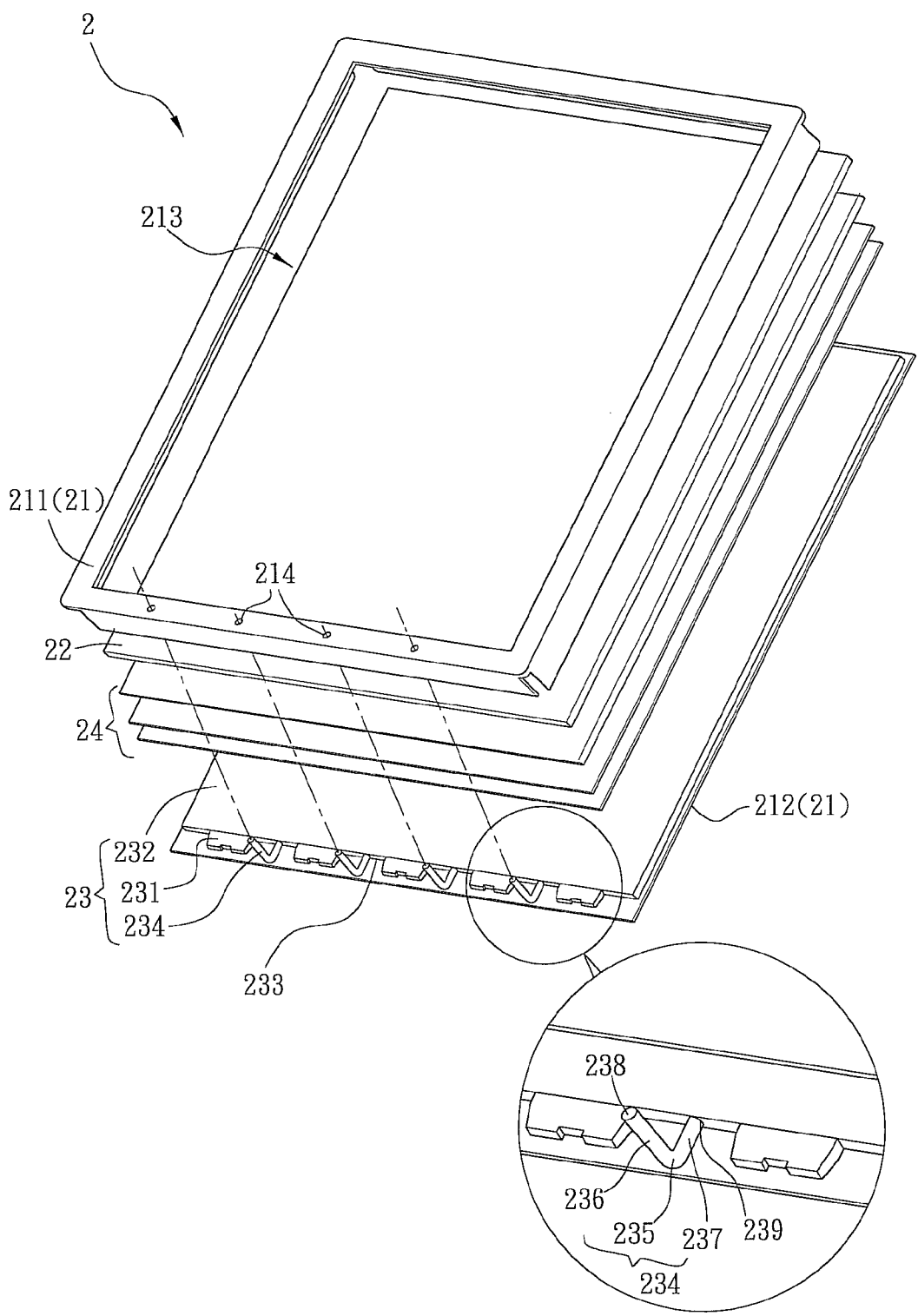
FIG. 3 is a partial exploded diagram showing the electronic device in FIG. 2.

As shown in FIG. 2 and FIG. 3, an electronic device 2 of a preferred embodiment of the invention includes a case 21, a display panel 22 and a backlight module 23.

The case 21 consists of an upper cover 211 and a lower cover 212, and the upper cover 211 has an opening 213 and at least a hole 214. The display panel 22 is disposed at the case 21 to display information, and the backlight module 23 is disposed in the case 21 as the light source of the display panel 22. The display panel 22 is located at a position adjacent to the opening 213, and the backlight module 23 is disposed under the display panel 22.

In the embodiment, the display panel 22 may be a liquid crystal panel, and the liquid crystal panel may be a transmissive liquid crystal panel, a reflective liquid crystal panel or a semi-transmissive and semi-reflective liquid crystal panel, and son on.

As shown in FIG. 3, the backlight module 23 of the embodiment has at least a light emitting element 231, a light-guide plate 232 and at least a light-guide tube 234. The backlight module 23 having a plurality of light emitting elements 231 and a plurality of light-guide tubes 234 is illustrated hereinbelow.

In the embodiment, the light emitting elements 231 may be light emitting diodes or cold cathode fluorescent lamps. For a small-sized display device, it is a better choice to select the light emitting diodes as the light emitting elements 231.

The light emitting elements 231 of the embodiment are disposed at one side 233 of the light-guide plate 232, and the light-guide plate 232 can convert the light emitted by the light emitting elements 231 to planar light and guide the planar light to the display panel 22.

In the embodiment, the light-guide plate 232 is an important element for affecting luminous efficiency, and it can be produced via an injection molding process. In the embodiment, the light-guide plate 232 is a wedge-shaped plate. The main function of the light-guide plate 232 is guiding the direction of the light to enhance the light luminance and control the brightness to be uniform.

In the embodiment, the light emitting elements 231 and the light-guide tubes 234 are located at the side 233, and then the light emitted by the light emitting elements, 231 and the light-guide tubes 234 enters into the light-guide plate 232 from the side 233, and then the light uniformly illuminates the display panel 22 via micro-structure pattern designs with different density and size in the light-guide plate 232. A reflection plate (not shown) is further placed under the light-guide plate 232, and the light leaked from the bottom surface of the light-guide plate 232 is reflected back to the light-guide plate 232 by the reflection plate. Then, the light is prevented from being leaked to increase the usage efficiency of the light.

As shown in FIG. 3, each of the light-guide tubes 234 of the embodiment has a bending tube 235 and two straight tubes 236 and 237. The straight tubes 236 and 237 extend from two ends of the bending tube 235, and the openings at ends of the straight tubes are used as a light input end 238 and a light output end 239, respectively.

The light input end 238 passes through the hole 214 of the case 21 to be exposed, and the light output end 239 is located at the side 233 of the light-guide plate 232. Thus, the light-guide tubes 234 can guide the ambient light into the light-guide plate 232. Herein, the light output end 239 of the light-guide tube 234 contacts the light-guide plate 232.

In the embodiment, the light-guide plate 232 can convert the light emitted from the light output end 239 to planar light, and then the ambient light can be used as the light source of the backlight module 23.

The light-guide tube 234 of the embodiment may be a light-guide pillar. After the ambient light enters the light-guide pillar from the light input end 238, it is reflected perfectly. Therefore, the entering ambient light goes forward along a pillar axis in the light-guide pillar, and finally, the light is emitted from the light output end 239.

As shown in FIG. 3, the electronic device 2 of the embodiment further includes a plurality of optical films 24, and the optical films 24 are superposed between the light-guide plate 232 and the display panel 22. In the embodiment, the optical films 24 include diffusers, brightness enhancement films and so on, and then the light guided out by the light-guide plate 232 is further uniform and bright.

As shown in FIG. 3, each of the light output ends 239 of the light-guide tubes 234 can be located between two light emitting elements 231, and the light-guide tubes 234 and the light emitting elements 231 are interlacedly disposed. Then, the light entering into the light-guide plate 232 is uniform, and the light guided out by the light-guide plate 232 is also further uniform.

In the embodiment, the electronic device 2 of the embodiment may be a liquid crystal display, a personal digital assistant, a mobile phone, a global positioning system (GPS), a hand-held game or other electronic device having a display function.

Via the design of the preferred embodiment, both the ambient light and the light emitting element 231 can be used as the light source of the backlight module 23.

Figure 4:
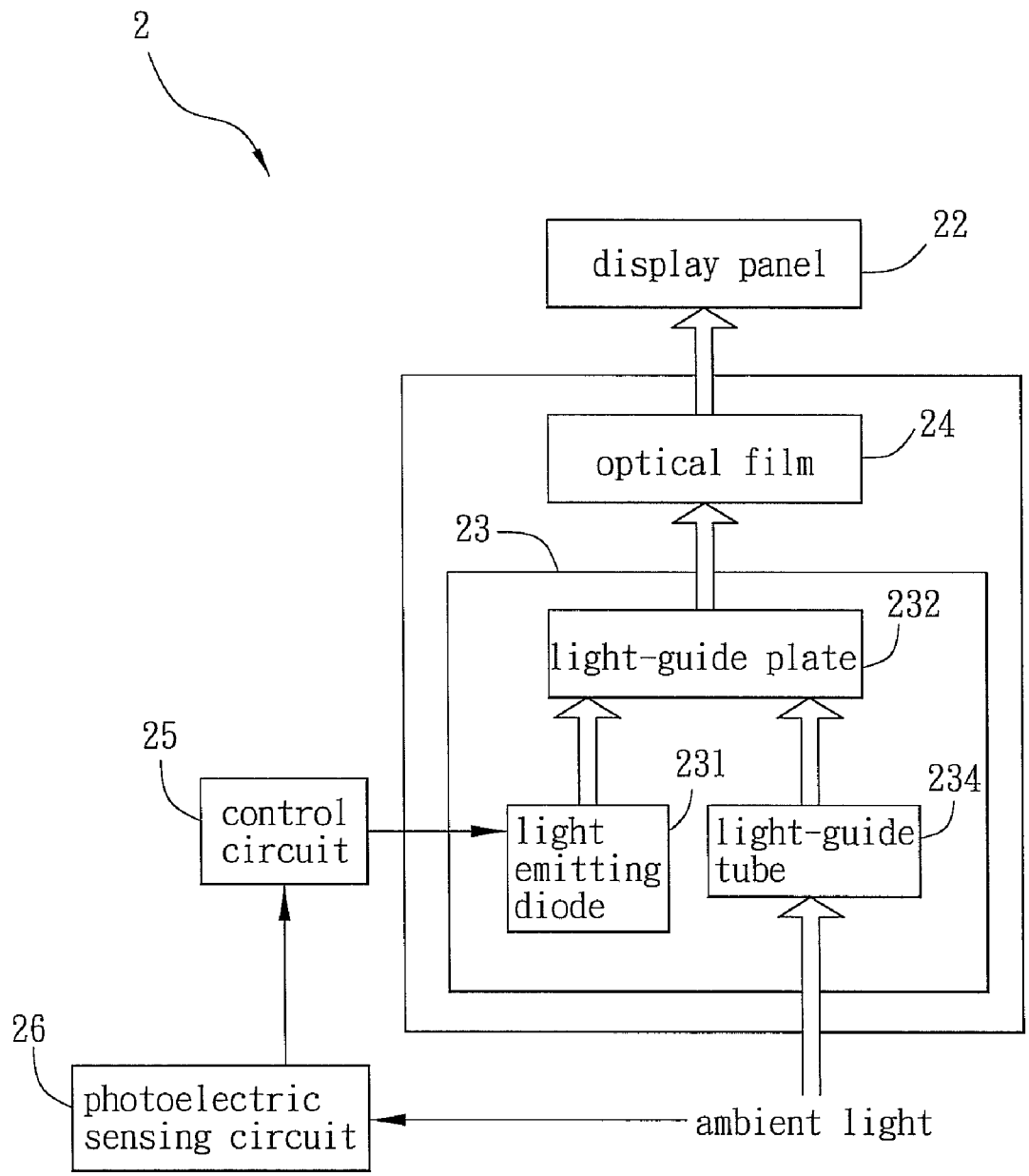
FIG. 4 is a block diagram showing an electronic device according to a preferred embodiment of the invention.

As shown in FIG. 4, the electronic device 2 further includes a control circuit 25 and a photoelectric sensing circuit 26 coupled to the control circuit 25. The photoelectric sensing circuit 26 can sense the light intensity of the ambient environment of the electronic device 2 to generate a sensing result, and the control circuit 25 can determine the light intensity of the ambient environment of the electronic device 2 to control the luminous intensity of the light emitting elements 231 according to the sensing result.

In detail, when the control circuit 25 determines that the light intensity of the ambient environment of the electronic device 2 is sufficient, for example, in the sun or in a bright room, the control circuit 25 can control the light emitting elements 231 to be off. The ambient light enters from the light input ends 238 (as shown in FIG. 3) of the light-guide tubes 234 and is emitted into the light-guide plate 232 from the light output ends 239 (as shown in FIG. 3). The backlight module 23 can utilize the external light (the ambient light) as the light source without the light emitted by the light emitting elements 231, thereby saving electricity. On the other hand, when the control circuit 25 determines that the light intensity of the ambient environment of the electronic device 2 is insufficient, for example, in a room, the control circuit 25 can control the light emitting elements 231 to emit light. That is, the backlight module 23 utilizes the ambient light and the light emitting elements 231 as the light source at that moment. That is, the backlight module 23 can use the ambient light as its main light source and use the light emitting elements 231 as its auxiliary light source to reinforce the insufficient brightness.

Figure 5:
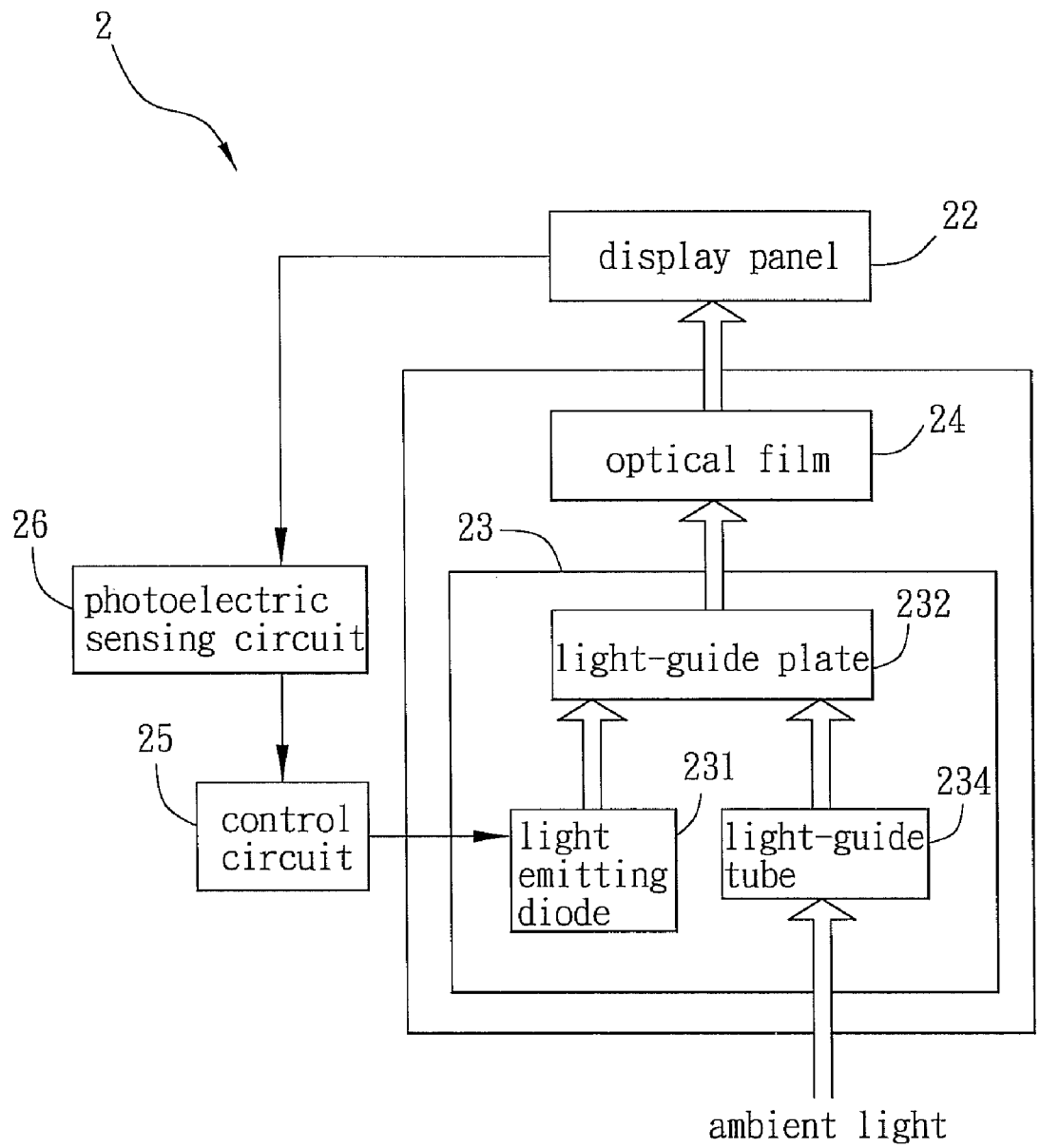
FIG. 5 is a block diagram showing an electronic device according to another preferred embodiment of the invention.

As shown in FIG. 5, in another embodiment of the invention, the photoelectric sensing circuit 26 can sense the brightness of the display panel 22 to generate another sensing result, and the control circuit 25 can determine the brightness to control the light emitting elements 231 to emit light according to the sensing result. When the control circuit 25 determines that the brightness of the display panel 22 is insufficient, it controls the light emitting elements 231 to emit light to enhance the brightness.

To sum up, the backlight module 23 of the embodiment of the invention has double light sources (the ambient light entering from the light-guide tubes and the light emitting elements), and the ambient light can be used as the main light source in usual usage. When the brightness of the display panel is insufficient, the light emitting elements can be turned on to enhance the brightness.

Compared with the conventional technology, the light-guide tubes in the electronic device of the invention pass through the case to be exposed outside to allow the ambient light to enter the backlight module from the light input end and further enter the light-guide plate from the light output end. Therefore, the ambient light can be used as the light source of the backlight module. Since the ambient light can be used as the light source, the luminous intensity of the backlight module is increased along with the increase of the intensity of the ambient light. Thus, the problem that the brightness of the display panel is insufficient in the sum in the conventional technology is solved.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An electronic device comprising:
   a case having at least a hole;
   a display panel disposed at the case; and
   a backlight module which is disposed in the case as the light source of the display panel and has at least a light emitting element, a light-guide plate and at least a light-guide tube, wherein the light-guide plate guides light emitted by the light emitting element to the display panel, the light-guide tube has a light input end and a light output end, the light input end is disposed at the hole of the case and is exposed outside, and the light output end is located at one side of the light-guide plate.

2. The electronic device according to claim 1, wherein the light emitting element is disposed at the side of the light-guide plate, and the light-guide plate converts the light emitted by the light emitting element to planar light.

3. The electronic device according to claim 1, wherein the light-guide plate converts the ambient light guided by the light-guide tube to planar light.

4. The electronic device according to claim 1, wherein the light output end of the light-guide tube contacts the light-guide plate.

5. The electronic device according to claim 1, wherein the light-guide tube has a bending tube and two straight tubes, the straight tubes extend from two ends of the bending tube, and openings at ends of the straight tubes are used as the light input end and the light output end, respectively.

6. The electronic device according to claim 1 further comprising:
   a photoelectric sensing circuit which senses light intensity of the ambient environment of the electronic device to generate a sensing result; and
   a control circuit coupled to the photoelectric sensing circuit and determining the light intensity of the ambient environment of the electronic device to control luminous intensity of the light emitting element according to the sensing result.

7. The electronic device according to claim 6, wherein when the control circuit determines that the light intensity of the ambient environment of the electronic device is sufficient, the control circuit controls the light emitting element to be off.

8. The electronic device according to claim 6, wherein when the control circuit determines that the light intensity of the ambient environment of the electronic device is insufficient, the control circuit controls the light emitting element to emit light.

9. The electronic device according to claim 1 further comprising:
   a photoelectric sensing circuit which senses brightness of the display panel to generate a sensing result; and
   a control circuit coupled to the photoelectric sensing circuit and determining the brightness of the display panel to control the light emitting element to emit light according to the sensing result.

10. The electronic device according to claim 9, wherein when the control circuit determines that the brightness of the display panel is insufficient, the control circuit controls the light emitting element to emit light.

11. The electronic device according to claim 1, wherein the light emitting element is a light emitting diode or a cold cathode fluorescent lamp (CCFL).

12. The electronic device according to claim 1, wherein the backlight module has a plurality of the light emitting elements and a plurality of the light-guide tubes, and the light emitting elements and the light-guide tubes are interlacedly disposed.

* * * * *